US009207145B1

(12) United States Patent
Hill et al.

(10) Patent No.: US 9,207,145 B1
(45) Date of Patent: Dec. 8, 2015

(54) SYSTEM AND METHOD FOR NULL-LENS WAVEFRONT SENSING

(71) Applicants: Peter C. Hill, Washington, DC (US); Patrick L. Thompson, Laurel, MD (US); David L. Aronstein, Silver Spring, MD (US); Matthew R. Bolcar, Laurel, MD (US); Jeffrey S. Smith, Baltimore, MD (US)

(72) Inventors: Peter C. Hill, Washington, DC (US); Patrick L. Thompson, Laurel, MD (US); David L. Aronstein, Silver Spring, MD (US); Matthew R. Bolcar, Laurel, MD (US); Jeffrey S. Smith, Baltimore, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 44 days.

(21) Appl. No.: 14/186,833

(22) Filed: Feb. 21, 2014

Related U.S. Application Data

(60) Provisional application No. 61/868,780, filed on Aug. 22, 2013.

(51) Int. Cl.
*G01B 9/00* (2006.01)
*G01M 11/02* (2006.01)

(52) U.S. Cl.
CPC .................. *G01M 11/0257* (2013.01)

(58) Field of Classification Search
CPC ............... G01M 11/0257; G01B 9/00
USPC .......................................... 356/124
See application file for complete search history.

(56) References Cited

U.S. PATENT DOCUMENTS

| 7,710,626 B2 * | 5/2010 | Ito ............................. 359/224.1 |
| 2007/0280609 A1 * | 12/2007 | Ito ................................... 385/94 |
| 2008/0304029 A1 * | 12/2008 | Pforr et al. ..................... 355/44 |

* cited by examiner

*Primary Examiner* — Roy M Punnoose

(57) ABSTRACT

A method of measuring aberrations in a null-lens including assembly and alignment aberrations. The null-lens may be used for measuring aberrations in an aspheric optic with the null-lens. Light propagates from the aspheric optic location through the null-lens, while sweeping a detector through the null-lens focal plane. Image data being is collected at locations about said focal plane. Light is simulated propagating to the collection locations for each collected image. Null-lens aberrations may extracted, e.g., applying image-based wavefront-sensing to collected images and simulation results. The null-lens aberrations improve accuracy in measuring aspheric optic aberrations.

11 Claims, 5 Drawing Sheets

SYSTEM AND METHOD FOR NULL-LENS WAVEFRONT SENSING

ORIGIN OF THE INVENTION

The invention described herein was made by employees of the United States Government, and may be manufactured and used by or for the Government for governmental purposes without the payment of any royalties thereon or therefor.

BACKGROUND OF THE INVENTION

1. Field of the Invention

The present invention is generally related to measuring transmitted or reflected optical null-lens wavefronts, and more particularly to measuring the transmitted wavefront of a refractive null-lens or a computer-generated hologram (CGH).

2. Background Description

A typical aspheric optical surface has manufacturing errors or figure errors, i.e., errors between the surface design figure (the intended surface shape) and the manufactured surface shape. Measuring those errors has been challenging. The more aspheric the optical surface, i.e., the more the surface deviates from a spherical shape, the more challenging the measurement. Null-lenses are used to measure the figure of an asphere and its optical flaws or defects with great precision during optical element fabrication. Each null lens must be custom designed for the aspheric optic being measured and is designed to largely cancel out (i.e., null) a reflected or transmitted wavefront. Generally, null-lens design complexity increases with the numerical aperture of the manufactured aspheric optic. Such null-lens designs can include two or more custom-made precision optical components that require precise alignment to one another. Null-lenses must be accurately aligned to both a reference source and the aspheric optic under test.

Null-optics (also called null correctors or null lenses) have typically been used for measuring low-spatial-frequency fabrication errors (also called figure errors) during aspheric optical fabrication and testing. Measuring light passes through both the null lens and the aspheric optic determines the optical wavefront of the combined optic system, i.e., the null-lens and aspheric optic. Understanding the performance of the aspheric optic alone, however, is the final goal of the measurement. Typically, the combined optic system wavefront is measured using one of three methods: image-based wavefront sensing or phase retrieval; interference/fringe-based wavefront sensing, including interferometry; and, sub-aperture imaging and centroiding, e.g., with Shack-Hartmann wavefront sensors. For an example of testing of an optical surface figure using image-based wavefront sensing in metrology, see, e.g., G. R. Brady, "Application of Phase Retrieval to the Measurement of Optical Surfaces and Wavefronts," Ph.D. dissertation, University of Rochester, 2008; and see, G. R. Brady and J. R. Fienup, "Measurement Range of Phase Retrieval in Optical Surface and Wavefront Metrology," Appl. Opt. 48, 442-449 (2009).

Typically the null-lens has comparable aberrations to the aspheric optic it is designed to measure. Those aberrations alter the light traveling through the component(s), i.e., referred to as the optical wavefront, phase, or optical path difference (OPD). Sources for unknown, or unintended, aberrations include, for example, component manufacturing defects, assembly/integration defects, or errors from misalignment to the reference source or the aspheric optic under test.

There are four categories of null-lens wavefront components: design or nominal wavefront for the individual lens or individual component lenses; wavefront errors from manufacturing imperfections in each individual component lens; wavefront errors from individual null-optic element misalignments; and, test-alignment wavefront errors from null-lens misalignment relative to the reference source or the aspheric optic under test. Of these four categories, previously test alignment wavefront errors have been unmeasurable because these errors arise from how the end user uses the null-lens, e.g., during aspheric optic fabrication and testing, typically to measure figure errors. The test alignment wavefront errors were unmeasurable by the null-lens manufacturer, because the errors are post-delivery in end user alignment.

Since null-optic test-alignment aberrations were unmeasurable, previously, during the testing they would have been misattributed to the aspheric optic being measured. Consequently, it is important to identify and verify null-optic aberrations to precisely measure aspheric optics.

Thus, there is a need for measuring null-optic aberrations, and more particularly, for measuring null-lens design, manufacturing imperfection, and alignment wavefronts.

SUMMARY OF THE INVENTION

An aspect of the invention is qualification of a null-lens for precision fabrication, and testing, of an aspheric optic;

Another aspect of the invention is in situ testing and characterization of null-lenses intended for characterizing aspheric optics;

The present invention relates to a method of measuring aberrations in a null-lens including assembly and alignment aberrations. The null-lens may be used for measuring aberrations in an aspheric optic with the null-lens. Light propagates from a reference source through the null-lens. A detector pixel array collects measurement data at several detector locations about the null-lens nominal focal plane. Applying image-based wavefront-sensing to collected image measurement data provides estimates of null-lens aberrations. The null-lens aberration estimates improve accuracy in measuring aspheric optic aberrations.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
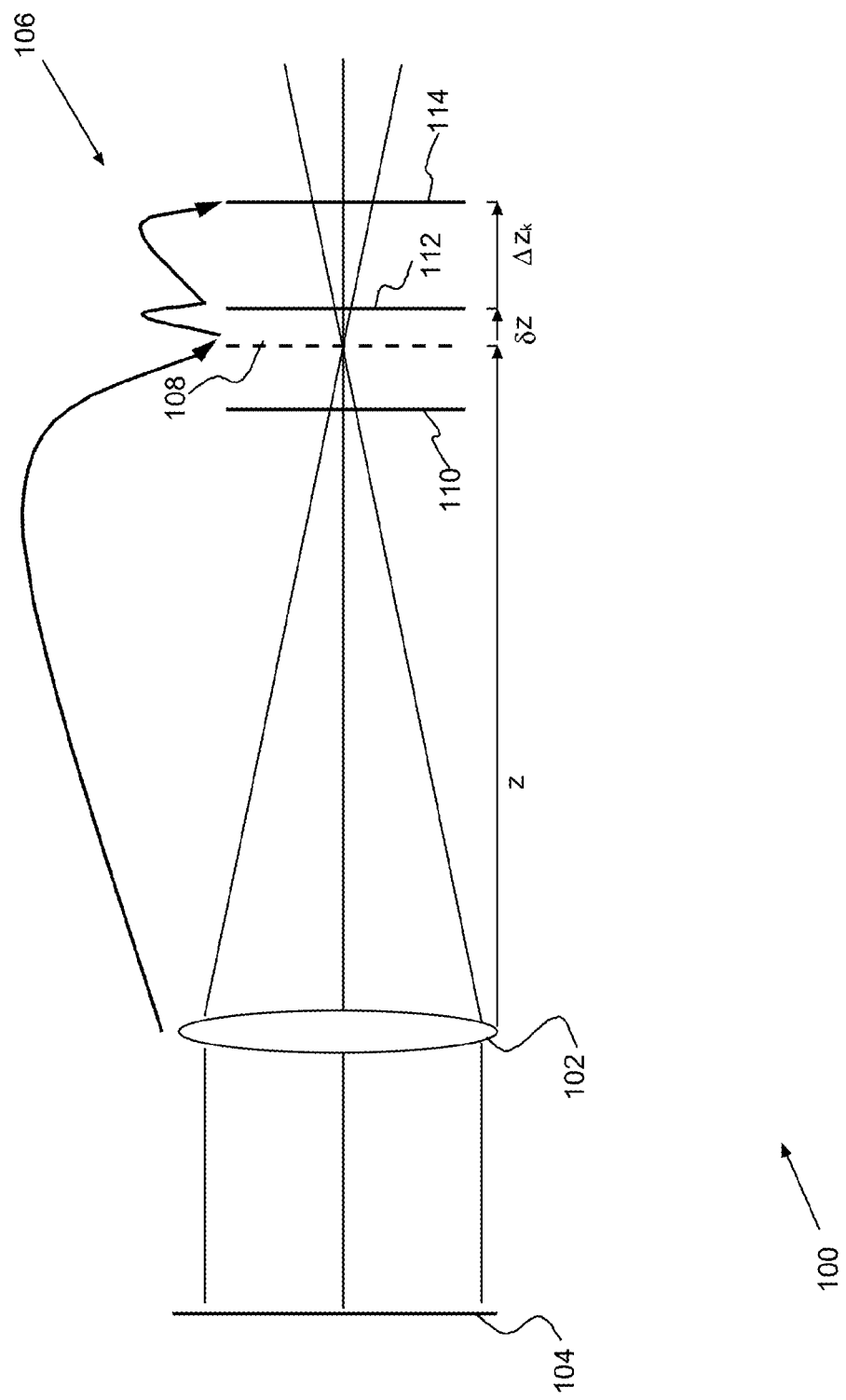
FIG. 1 shows an example of a method of measuring aberrations in a null-lens according to a preferred embodiment of the present invention.

Turning now to the drawings, and more particularly, FIG. 1 shows a schematic example of an alignment 100 for collecting phase-retrieval data for a null-lens and simulating null-lens 102 image propagation for characterizing aberrations with the null-lens 102 according to a preferred embodiment of the present invention. In what is well known as "off-conjugate" testing, null lenses are measured in tests in which the light source or detector are at different distances away from the aspheric lens that the null-lens is being used to measure. Such off-conjugate testing requires adjusting wavefront answers to infer how the aspheric lens will perform at its designed conjugates. The preferred characterization uses testing at the conjugates for which the optical system will operate in use, with the null-lens 102 compensating these aberrations.

The null-optic 102 may be precisely aligned in an optical test setup 100 having a known wavefront, illuminated (for example) using an arm of an interferometer or a light source that first passes through a spatial filter (e.g., a pinhole), in order to present a smoothly varying illumination profile to the test setup. Subsequent image-based wavefront sensing uses several images taken through the null-optic under test, with some aspect of the test setup being systematically varied from one image to the next. Most commonly, this systematic variation is diversity defocus, such that the amount by which each image is defocused is systematically varied, i.e., images are deliberately defocused by a different amount from the other images in the set. The light for each diversity-defocus image passes through the optical test setup and the null-lens. The resulting irradiance of the transmitted beam is measured by a light detector (e.g., a detector pixel array) and this image is saved on a computer.

Preferably, in collecting phase-retrieval data a light source 104 illuminates an aspheric optic, and a detector collects over a range of locations 106 about an approximated nominal focal (best focus) plane 108 in this example, while collecting at least one and preferably, several (N) images. During each measurement the detector moves to various N measurement planes 110, 112, 114, where N is 3 in this example. For example, an F/1.5 transmission sphere 104, which is the entrance pupil in this example, may provide a collimated beam to the null-lens 102, while sweeping the detector 110, 112, 114 through the range 106 near best focus 108. The collected the set of diverse images at measurement planes 110, 112, 114 characterize the null-lens 102.

The null-lens measurements may be either transmission or reflection measurements, e.g., the light can either transmit through, or reflect off of, the null-lens. Further, the null-lens 102 may be a reflective optic, a refractive optic, a CGH, or any other optic that distorts the wavefront in a predetermined way. The shape of the image data models depends on the shape and the illumination pattern of the optical system exit pupil. The image data also depends on the f-number of light incident at the detector measurement planes 110, 112, 114 and the size of the pixels in the light detector.

Preferably, as shown in this example and described herein, the collected images are somewhat out-of-focus images, systematically taken with different, varying amounts of defocus. Alternately, instead of focus, collected images may have varied image diversity type, depending individual test conditions. Varied image diversity type, may include for example, wavelength diversity varied for the light traveling through the system, or transverse translation diversity varied at the optical system exit pupil.

Using image-based wavefront sensing measures the null-lens wavefront. In addition to measuring design and manufacturing wavefront component aberrations, image-based wavefront sensing directly measures null-lens wavefront aberrations in the as-used configuration for the null-lens, measuring contributions from the previously difficult to measure categories, i.e., assembly-alignment wavefront and test-alignment wavefront. Assembly-alignment wavefront components result from how the null-lens components are misaligned relative to each other. Test-alignment wavefront components result from null-lens misalignment relative to the resource source or to the aspheric optic under test.

Additionally, the null-lens wavefront is measured with precision concurrently with other unknown aspects of the test configuration. Those aspects include the lens focal ratio or f-number, any present defocus in the analysis or test images, and how well the light detector samples the test images. Subsequent Monte Carlo simulations of the measurement and phase retrieval processes can establish uncertainties, e.g., error bars, for the null-lens wavefront estimation. A comparison of the analysis results using different subsets of the image data provides a rough estimate of the measurement uncertainties.

After collecting data for the last, $N^{th}$, image, ideal detector images are simulated by determining light propagating through the system under the same conditions used for collecting the data. Comparing the collected data with the ideal images, the optical wavefront most consistent with the set of N images may be extracted algorithmically.

Figure 2:
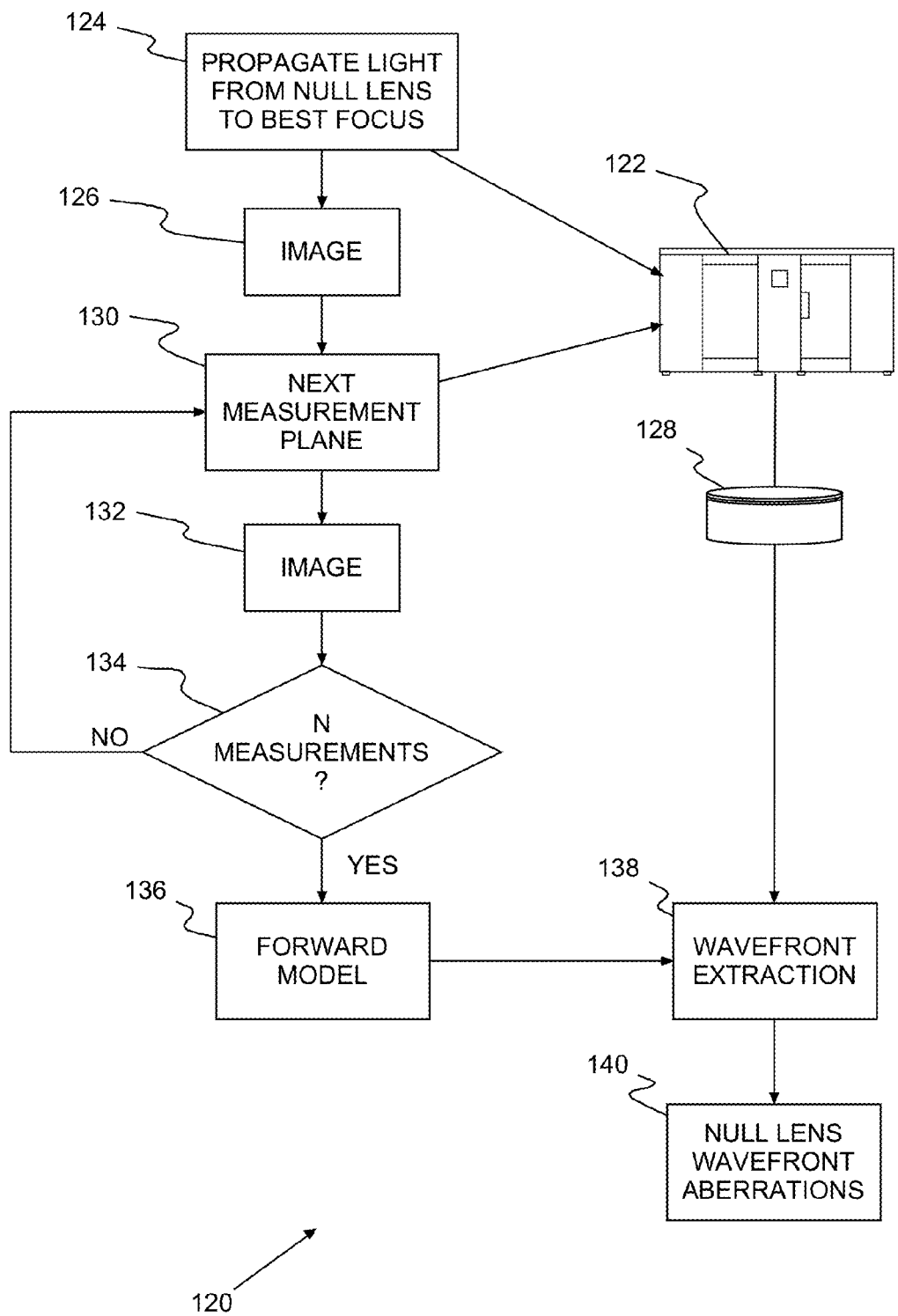
FIG. 2 shows an example of an alignment for collecting phase-retrieval data for a null-lens for characterizing aberrations with the null-lens.

FIG. 2 shows an example of a method 120 of simulating ideal detector images, e.g., using a typical computer 122, and extracting the optical wavefront most consistent with detector data collected for a set of N images in the arrangement 100 example of FIG. 1, according to a preferred embodiment of the present invention. Preferably, an image-based wavefront-sensing algorithm is applied to the collected data, and a two-step propagation is used to generate a forward model (i.e., the portion of the simulation that tracks the light from the system's exit pupil to the light detector) from which to extract null-lens wavefront aberrations most consistent with the collected image data.

In this forward model, an image first propagates 124 from the null-lens exit pupil (having diameter D) to the best focus location 108 at distance z in image space. Preferably, the optical system pupil field propagation is simulated, or other method of comparable or greater accuracy, in a Fresnel propagation from the null-lens 102 to the nominal focal plane 108, e.g., the best-focus field. This propagation may be implemented, for example, by applying the Fresnel approximation to integral (propagator) solutions of the Helmholtz wave equation. In this example these simulated 126 and stored 128 images were recorded at the approximate best-focus location 108, i.e., the plane where the defocus component of the optical wavefront vanishes.

Second, images are simulated at the various detector measurement planes 110, 112, 114. An angular spectrum method may be applied to propagate the field about the nominal focal plane 108 to various detector measurement planes 110, 112, 114. Alternately, a Fresnel propagation from the null-lens exit pupil to these measurement planes 110, 112, 114 may be used. An image 132 is simulated at that location 112 nearest to the best focus location 108 and stored 128. For example, the angular spectrum (plane wave) representation of the field may propagate 130 the image from best focus location 108 to the nearest plane 112.

Thereafter, iteratively propagating 130 by various (N−1) 134 distances, Δzk, to other detector measurement locations 110, 114 simulates a complete set of corresponding diverse images, e.g., subsequently using the angular spectrum method. The set of N simulated images characterize an ideal null-lens wavefront at best focus location 108 and respective image planes 110, 112, 114 and provides a forward model 136, of the null-lens 102. The difference between the forward model 136 and the previously collected set of images 128, indicates aberrations in the null-lens wavefront 140. The null-lens wavefront 140 can be extracted 138 from the data iteratively, by updating the wavefront in the simulated null-lens exit pupil to reflect the iteration aberrations and finding the resulting difference until the difference falls below some threshold.

Figure 3A:
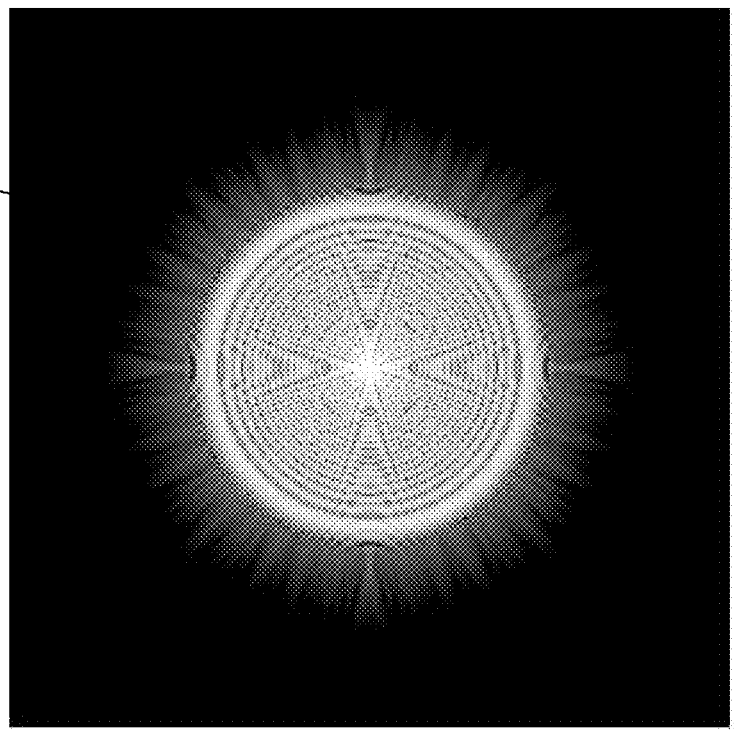
FIGS. 3A-B show an example comparing simulation results against collected data with focus at a plane that is approximately at the of best focus for the null-lens and aspheric optic system.
Figure 3B:
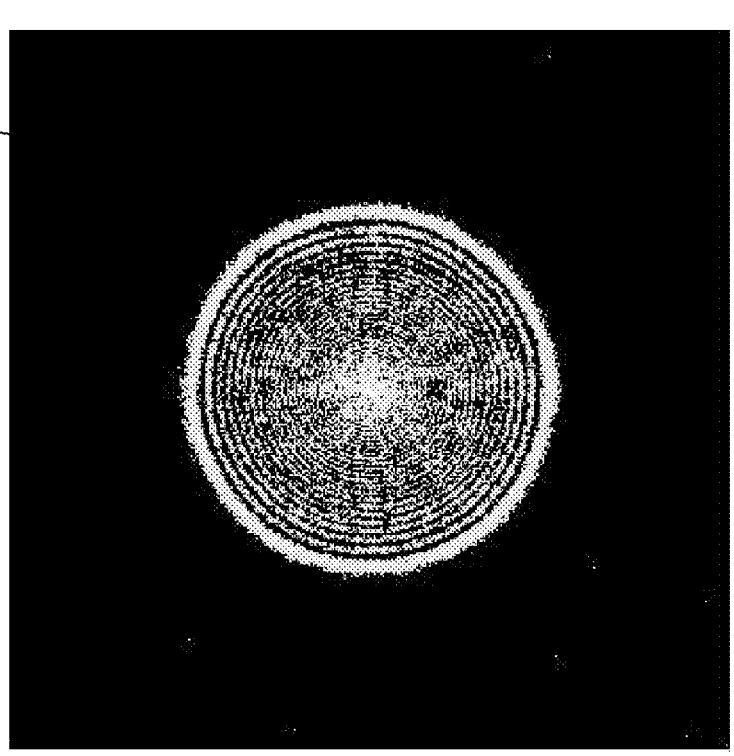
Figure 4A:
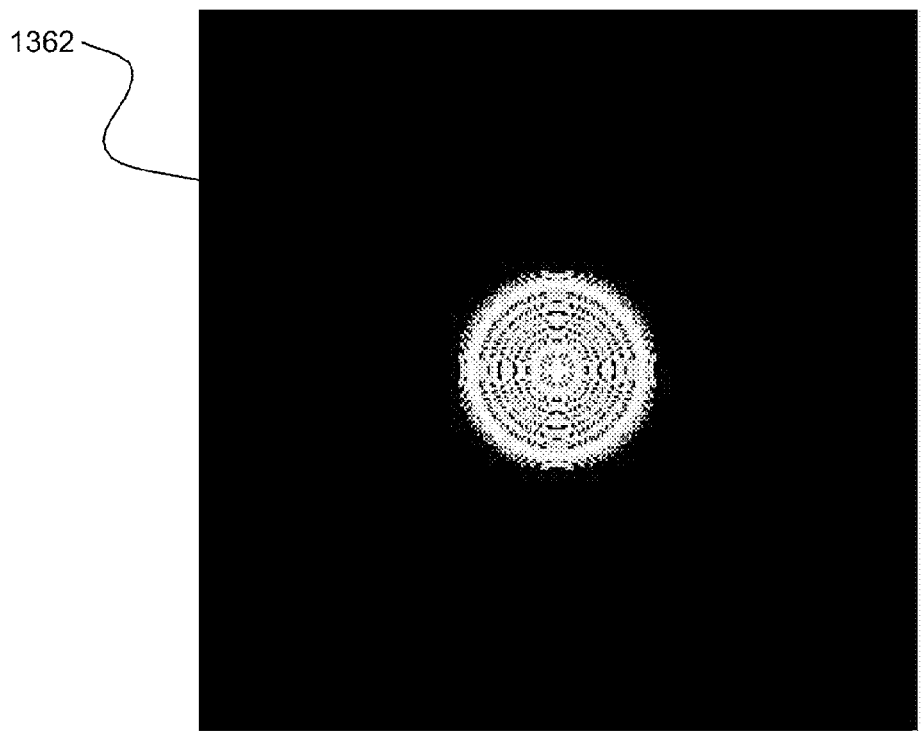
FIGS. 4A-B show an example comparing simulation results against collected data with focus at a plane that is a selected distance away from the approximated best focus plane.
Figure 4B:
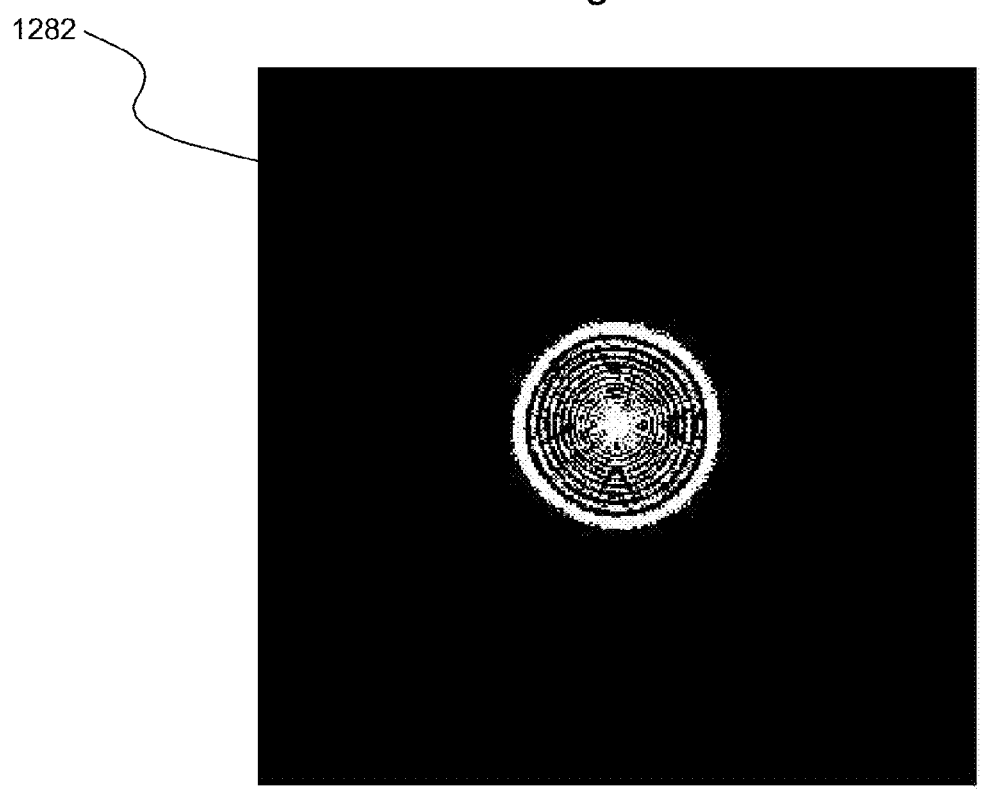
Figure 5A:
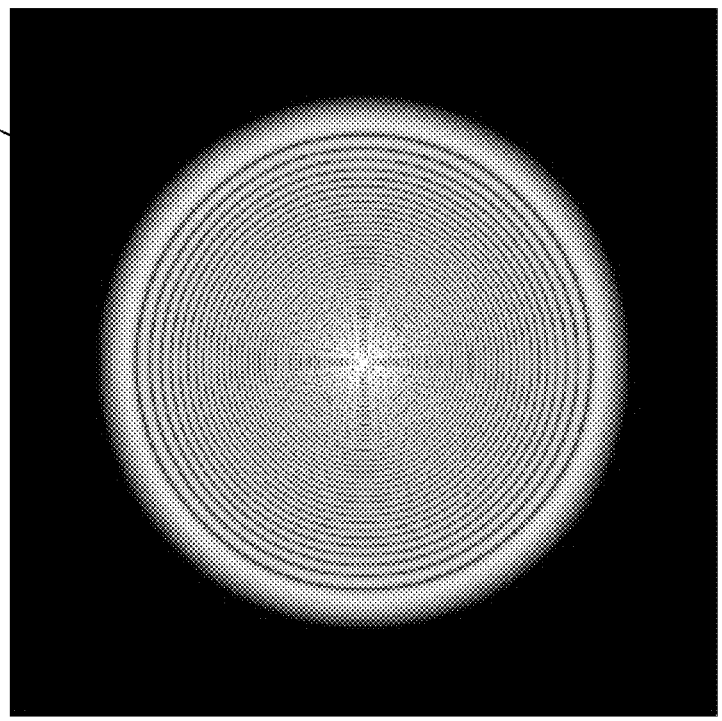
FIGS. 5A-B show an example comparing simulation results against collected data with focus at a plane that is a selected distance closer than the approximated best focus plane.
Figure 5B:
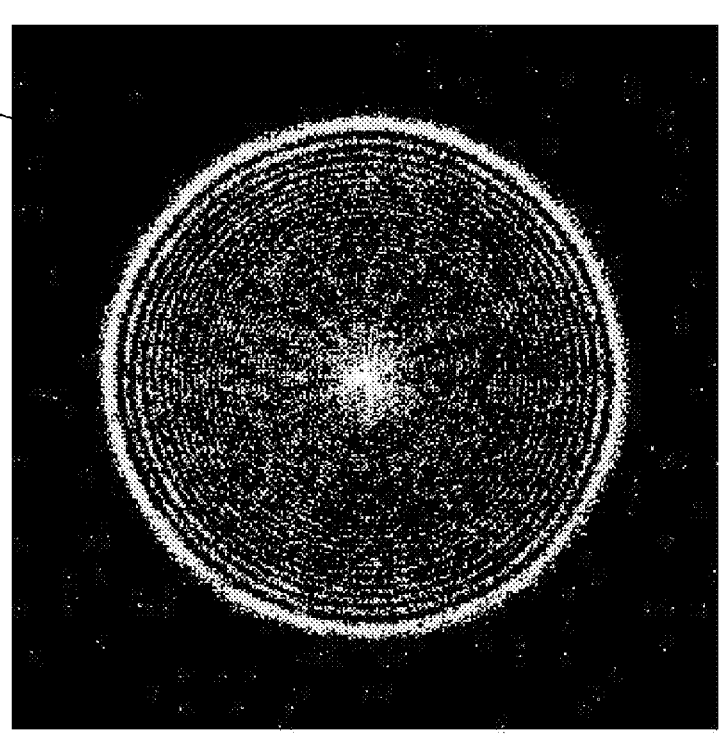

FIGS. 3A-B show an example comparing simulation results 1360 against collected data 1280 with focus at 0.0; FIGS. 4A-B show an example comparing simulation results 1362 against collected data 1282 with focus at +0.250 inches; and FIGS. 5A-B show an example comparing simulation results 1364 against collected data 1284 with focus at −0.250 inches.

Generally, there are two categories of phase (or wavefront) retrieval algorithms: iterative-transform algorithms and non-linear optimization algorithms. Either may be applied to simulating the wavefront. Also, although shown in FIG. 2 as estimating the wavefront after collecting data 128, this is for example only. Simulation may be done prior to, or concurrent with, collecting data.

Suitable iterative-transform algorithms, i.e., based on the Misell-Gerchberg-Saxton algorithm, iterative simulate light traveling back and forth through the optical system (e.g., 100) until the algorithm converges. R. W. Gerchberg et al., "A practical algorithm for the determination of phase from image and diffraction plane pictures," *Optik* 35, 237-246 (1972) provides an example of an iterative-transform algorithm. Iterative-transform algorithms uses the optical model or measurement data as constraints on the unknown wavefront. Each iteration simulates light from the optical system exit pupil to the detector, and then, from the detector back to the exit pupil. In each iteration, the optical model or measurement data replaces simulation results at each destination, first at the detector, and then at the exit pupil, while the simulation uses the phase (the wavefront) from the previous iteration destination until the phase difference between iterations is below some threshold, i.e., the algorithm has converged.

Non-linear optimization algorithms simulate the forward propagation only, i.e., from the exit pupil to the detector. Examples of non-linear optimization algorithms are described by J. R. Fienup, "Phase-retrieval algorithms for a complicated optical system," *Applied Optics* 32, 1737-1746 (1993); and, S. T. Thurman et al., "Complex pupil retrieval with undersampled data," *Journal of The Optical Society of America A,* 26, 2640-2647 (2009). Using a single (scalar) metric after simulation the simulated/predicted images are compared against measured images. Typically, the scalar metric is a normalized root-mean-squared (rms) error between simulation and measurement. The simulation objective is to minimize the scalar metric with respect to the wavefront in the exit pupil. Minimizing the normalized rms error provides a numeric indication, or figure of merit, that indicates that the retrieved image most consistently matches the recorded image data.

It should be noted that the sampling ratio Q determines the necessary detector pixel size for adequate measurements. The sampling ratio is defined by $Q=\lambda(F/\#)/\Delta u$, where $\lambda$ is the wavelength of light, F/# is the ratio of the distance of propagation, z, to the exit-pupil diameter, D, and $\Delta u$ is the spacing of detector pixels. A sampling ratio of Q=2 represents a critically sampled light intensity in the sense of the Nyquist Sampling Theorem.

Typically, the light source wavelength $\lambda$, the detector pixel spacing $\Delta u$, and the exit-pupil diameter D are well known. The propagation distance z is sensitive to the null-lens 102 alignment along the optical axis. The initial propagation distance z uncertainty maps to a corresponding uncertainty in the sampling ratio Q.

Preferably, the set of collected images is large and diverse enough to allow for improving knowledge of other quantities of interest during the execution of the phase-retrieval algorithm. Such quantities may include, for example, the transverse beam intensity in the exit-pupil, the detector position for each data frame recorded, and the sampling ratio Q.

If defocus distances, $\Delta zk$, along the optical axis (where the detector was placed) are inaccurate, the phase-retrieval algorithm shows the presence of Zernike defocus in the optical system wavefront. The uncertainty in the defocus distances (detector position uncertainty) may be improved by directly optimizing the values in non-linear optimization, or by using defocus sensed by the algorithm in a "feedback loop." The defocus coefficient of fringe Zernike $Z_4$ and the position correction $\Delta z$ are paraxially related by $Z_4=\frac{1}{16}*D^2\Delta z/(z*(z+\Delta z))$.

Images formed from hard-edged pupils have a sharp spatial frequency cutoff. This sharp cutoff facilitates determining the sampling ratio by examining the spatial frequencies of the images, preferably, using the modulation transfer function (MTF). Examples of how to improve knowledge of Q during phase retrieval are provided by, T. P. Zielinski et al., "Determination of the Sampling Factor in a Phase-Diverse Phase Retrieval Algorithm," *Frontiers in Optics, OSA Technical Digest* (CD) (Optical Society of America, 2010), paper FWJ3; and D. Aronstein and J. S. Smith, "Recovery of the Image-Plane Sampling Parameter Q within Iterative-Transform Phase Retrieval," *Frontiers in Optics, OSA Technical Digest* (Optical Society of America, 2011), paper FThD6.

Advantageously, image-based wavefront sensing according to a preferred embodiment of the present invention facilitates eliminating alignment errors and other previously encountered problems in measuring null-lenses "off conjugate." Furthermore, all null-lens wavefront components are measured in as-used alignments and configurations without requiring additional hardware, accelerating null-lens acceptance testing and reducing manufacturing turn-around iterations. Thus, the present invention provides for testing null-lenses in single pass using the same alignment and geometry intended for subsequently testing/characterizing an aspheric optic. This is accomplished with minimal additional support equipment, or smaller and less expensive additional test hardware.

Moreover, the present invention avoids retrace errors inherently found in double-pass geometry that has been required for interference-based measurements. Measurement accuracy results also are not limited by the number of sensor lenslets or mask holes, as they are when utilizing wavefront sensors, for example, using the Shack-Hartmann configuration, making it easier to correctly characterize optical systems with high wavefront-slope or high-spatial-frequency features. Having verified the null-optic, both for correct manufacturing and for test setup integration, reduces metrology setup uncertainties for subsequently testing the aspheric optic and provides for independently measures aspheric error. Thus, unlike prior piecemeal or double pass configuration measurement approaches, the present invention substantially reduces final estimate uncertainties that might otherwise be found in the null-lens wavefront, and subsequently, attributed to the lens being manufactured when tested using the null lens.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of measuring aberrations in an aspheric optic with a null-lens, said null-lens having aberrations including assembly and alignment aberrations, said method comprising:
    measuring null-lens aberrations in alignment with an aspheric optic, comprising:
        propagating light from said aspheric optic through a null-lens,
        sweeping a detector through the focal plane of said null-lens, image data being recorded at one or more locations about said focal plane,
        recording one or more images as one or more recorded images from light propagating through said null-lens;
        calculating a simulated image through said null-lens for each recorded image and storing as a simulated image for comparison, and
        extracting null-lens aberrations from said recorded said one or more images responsive to simulation results; and
    measuring aspheric optic aberrations by comparing a simulated image to one or more recorded image.

2. A method as in claim 1, wherein said one or more locations comprises a plurality of locations, image data at said plurality of locations being collected for out of focus images.

3. A method as in claim 2, wherein calculating a simulated image comprises generating a best focus image at said focal plane and a corresponding calculated simulated image for each of said one or more images.

4. A method as in claim 3, wherein calculating a simulated image generates a forward model including said best focus image and the one or more corresponding images; and wherein extracting aberrations comprises application of image-based wavefront-sensing to said one or more recorded image and said forward model.

5. A method as in claim 4, wherein said null-lens has a diameter D, said best focus location is at a distance z from said null-lens, and calculating a simulated image comprises propagating an image from said best focus location first by a first corrective step, distance δz, to a nearest of said one or more locations.

6. A method as in claim 5, wherein propagating comprises a Fresnel propagation to said best focus location from said null-lens, and after propagating said first corrective step, propagating to remaining ones of said one or more locations.

7. A method as in claim 6, wherein extracting null-lens aberrations comprises application of image-based wavefront-sensing to said image data responsive to said forward model.

8. A method of measuring aberrations in an aspheric optic with a null-lens, said null-lens having aberrations including assembly and alignment aberrations, said method comprising:
    measuring null-lens aberrations in alignment with an aspheric optic, comprising:
        propagating light from said aspheric optic through a null-lens,
        sweeping a detector through the focal plane of said null-lens, out of focus image data being recorded at a plurality of locations about said focal plane,
        recording images as one or more recorded images from light propagating through said null-lens at said plurality of locations;
        calculating a simulated best focus image at said focal plane and a corresponding image for each of said recorded images, and
        extracting null-lens aberrations from said recorded said one or more recorded images responsive to simulation results, extracting comprising application of image-based wavefront-sensing to said recorded images responsive to the simulated images; and
    measuring aspheric optic aberrations by comparing a simulated image to one or more recorded image.

9. A method as in claim 8, wherein simulating generates a forward model including said best focus image and the one or more corresponding images.

10. A method as in claim 9, wherein said null-lens has a diameter D, said best focus location is at a distance z from said null-lens, and simulating comprises propagating an image from said best focus location first by a first corrective step, distance δz, to a nearest of said one or more locations.

11. A method as in claim 10, wherein propagating comprises a Fresnel propagation to said best focus location from said null-lens, and after propagating said first corrective step, propagating to remaining ones of said one or more locations.

* * * * *